United States Patent [19]
Lehnert et al.

[11] 4,422,020
[45] Dec. 20, 1983

[54] VERTICAL IMAGE CORRECTION FOR PROJECTION TV

[75] Inventors: Stanley E. Lehnert, Addison; Donald Ankeny, Schaumburg, both of Ill.

[73] Assignee: Zenith Radio Corporation, Glenview, Ill.

[21] Appl. No.: 400,329

[22] Filed: Jul. 21, 1982

[51] Int. Cl.³ ............................................. H01J 29/56
[52] U.S. Cl. .................................... 315/371; 315/387; 358/60
[58] Field of Search ...................... 315/387, 370, 371; 358/60

[56] References Cited

U.S. PATENT DOCUMENTS 3,488,554  1/1970  Voige ................................... 315/387
3,996,611 12/1976  Toone ................................... 358/60
4,198,591  4/1980  Ohmori ................................. 315/371

*Primary Examiner*—Theodore M. Blum

[57] ABSTRACT

A system for correcting for vertical off-axis optical projection distortions in a projection television is disclosed. In a projection television wherein the image projection axis is obliquely disposed in the vertical direction relative to the projection screen axis, a system for correcting for video image distortion caused by this configuration involving modulating the vertical size input is disclosed. A vertical rate correction signal is developed from the vertical output circuit and provided in a feedback arrangement to a sawtooth wave signal generating circuit for regulating electron beam vertical sweep in a projection television CRT, or CRT's. By decreasing CRT electron beam vertical sweep rate across that portion of the projection screen where the video image is vertically stretched and increasing the vertical sweep rate for the vertically compressed portion of the video image, a linear, distortion-free image is presented on the projection screen.

5 Claims, 6 Drawing Figures

VERTICAL IMAGE CORRECTION FOR PROJECTION TV

BACKGROUND OF THE INVENTION

This invention generally relates to projection television systems and more specifically is directed to providing a distortion-free image on the screen of a projection television.

A projection television system is generally comprised of a cathode ray tube (CRT), or a plurality of CRT's as in the case of a color projection television receiver for providing the three primary colors, and a large reflecting screen for presenting an enlarged image of the CRT-generated video image. Each CRT includes an electron gun, a target coated with a phosphor upon a surface directly facing the impinging electron beam, various mirror and/or lens combinations to achieve the desired optical projection, and a transparent face plate through which the image is projected upon the large projection screen external to the CRT's envelope. The projection screen is typically located in front of a viewer in a plane generally perpendicular to the viewing direction of the viewer.

The spatial relationship between the various projection television system components and the position of the viewer with respect thereto require careful consideration in system design. For example, positioning the CRT's of the television receiver and the projector in front of the projection screen will result in partial obstruction of the screen from a position directly in front thereof, at which position it is most desirable for the viewer to be positioned. In addition, the viewer may not be located between the CRT/projector combination and the projecting screen for then the projected light path will be interrupted and the display of video information will be rendered impossible. To overcome these restrictions, two basic approaches are generally taken in projection television systems. One involves lowering the projector position relative to the viewing screen while the other involves raising the projector so as to position it in a relatively high location. In either case, the goal is to remove the projector from the general viewing area in providing an unobstructed field of view over the entire sector forward of the projecting screen. By thus locating the projector, projection of the reproduced picture onto the enlarged screen is carried out obliquely from a position either below or above the axis of the projection screen.

By thus locating the image projector, optical distortions arise in the video image as a result of vertical off-axis pointing. In order to eliminate such distortions, one approach taken in the prior art has used a vertical correction deflecting coil in addition to the normal vertical deflecting coil. A parabolic signal having a horizontal frequency is applied to this correction deflecting coil to remove a bow distortion from the projected video image. Vertical correction deflecting coils of this type are expensive and add substantially to the complexity of the projection television system.

Another approach to video image vertical linearity correction in an off-axis projection television system is disclosed in U.S. Pat. No. 4,198,591 to Ohmori. This vertical deflecting circuit employs a horizontally derived correction signal which is either added to or multiplied with the vertical sawtooth wave deflection signal for regulating vertical sweep rate. This circuit is intended to correct for bow distortion in the CRT horizontal scan lines as projected on the viewing screen which appears as horizontal image distortion across the width of the viewing screen.

The present invention provides an improved means for correcting for linear distortion in the vertical direction of a video image displayed on an off-axis projection television screen.

OBJECTS OF THE INVENTION

Accordingly, it is an object of the present invention to provide a distortion-free image in a projection television wherein the projection screen is obliquely disposed relative to the image projection axis.

It is another object of the present invention to provide improved means for correcting for off-axis vertical distortion in a projection television which is inexpensive and compatible with existing projection television systems.

Still another object of the present invention is to provide a system equally capable of correcting for vertical stretch or compression distortion at the top or bottom of a video image displayed on a projection television screen.

A further object of the present invention is to provide a novel vertical deflection circuit for modulating the vertical deflection signal in a projection television system for eliminating vertical image distortion on the screen thereof.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
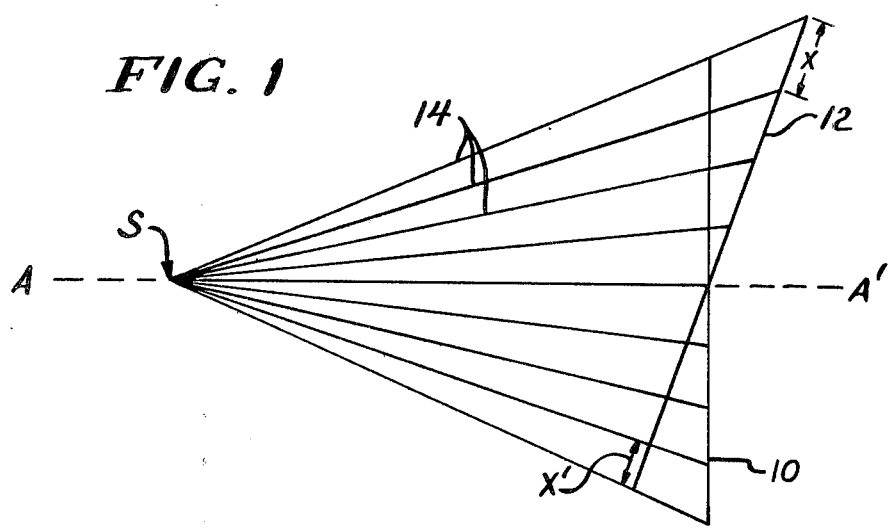
FIG. 1 is a simplified side planar view showing the relative orientation of a vertical and a tilted projection screen in a projection television system and the geometrical relation between light rays emitted by a single source on the respective projection screens.

Referring to FIG. 1, there is shown a simplified planar side view of a projection television system wherein a video image source S, such as a cathode ray tube (CRT), or CRT's, project an enlarged image on a projection screen. The projection screen when oriented generally vertically with respect to the image projection axis A—A' of the CRT's is represented as element 10. The projection screen when oriented obliquely with respect to the image projection axis A—A' is shown as element 12 in FIG. 1. Projection of a video image by the image source S is depicted as a series of rays 14 radially emitted from S over a predetermined sector thereof. For the case of the perpendicularly oriented projection screen 10, image rays 14 are equally spaced vertically thereacross and the image projected thereon does not suffer from vertical distortion. However, it can be seen that in the case of obliquely oriented projection screen 12, the corresponding inter-ray distances X and X' are not equal resulting in the portion of the image above the image projection axis A—A' appearing expanded in the vertical direction and the portion of the image below the image projection axis A—A' appearing vertically compressed. The relative orientation of expanded and compressed image portions will be reversed if the projection screen is rotated so that its lower portion is farther from the image source S than the upper portion thereof. In either case, the linear distortion of the image in the vertical direction seriously degrades the projection television system display.

Figure 2:
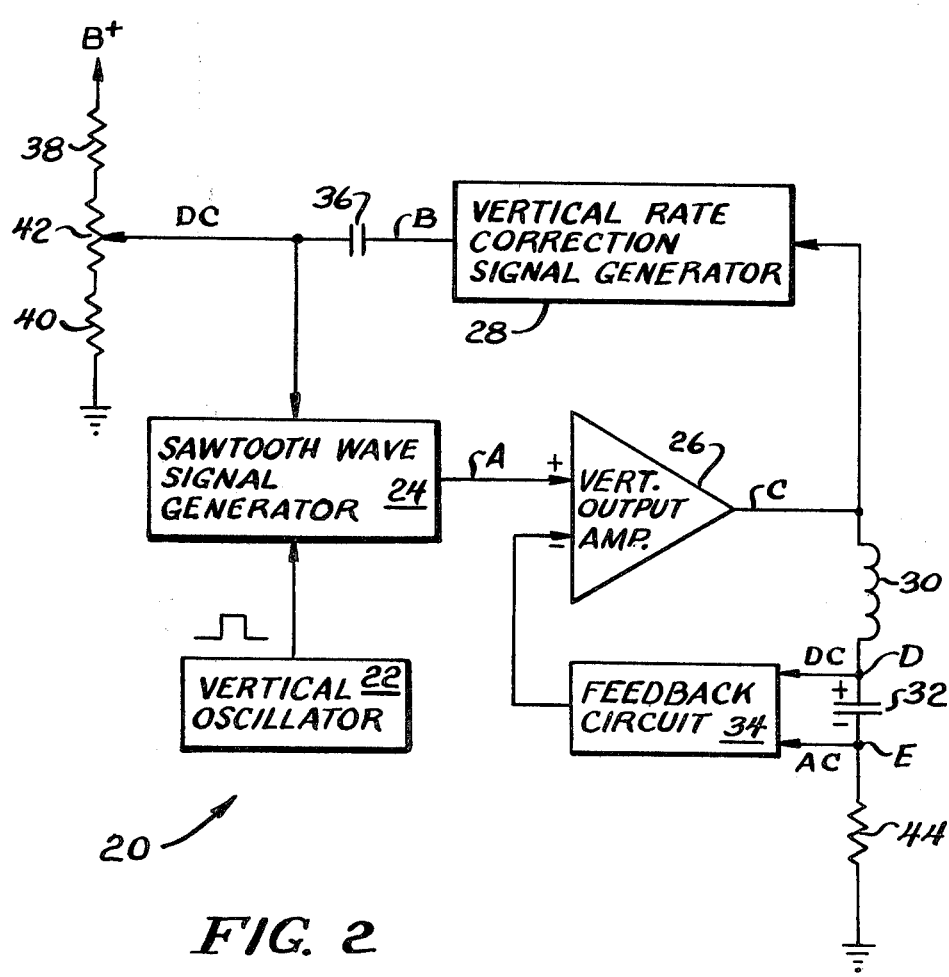
FIG. 2 is a simplified block diagram of a vertical image correction system for a projection television in accordance with the present invention.

Referring to FIG. 2, there is shown in simplified block diagram form a vertical image correction system 20 in accordance with the present invention for a projection television receiver in which the projection screen is obliquely oriented relative to the image projection axis. Vertical distortion in the form of image stretch and compression of the thus projected image is compensated for by decreasing and increasing the vertical deflection rate on respective upper and lower portions of the projection screen.

Briefly, the vertical image correction system 20 includes a vertical oscillator 22 which is synchronized with the received video signal and outputs a series of pulses in timed relation with the received video signal. The pulsed output of the vertical oscillator 22 is provided to a sawtooth wave signal generator 24 which provides a vertical deflection signal, the peak-to-peak amplitude of which establishes video image vertical height which is proportional to an input control signal provided to the sawtooth wave signal generator 24. The vertical deflection signal is provided to a vertical output amplifier 26 for driving the vertical deflection yoke, or coil, 30. The current through the vertical deflection yoke 30 is sensed and a signal representing the deflection yoke current is provided by feedback circuit 34 to one input of the vertical output amplifier 26 for comparison with the vertical deflection signal. The output of the vertical deflection output amplifier 26 thus represents the difference between optimum and actual vertical deflection yoke operation and is used to drive the vertical deflection yoke 30 for bringing these two yoke current values into coincidence. The output of the vertical output amplifier 26 is also provided to a vertical rate correction signal generator 28 which outputs a correction signal to the sawtooth wave signal generator 24 for changing the vertical height of the video image at a linear rate throughout the vertical scan interval.

More particularly, a vertical oscillator 22 is responsive to vertical sync pulses or vertical blanking pulses in the received video signal for generating a series of pulsed output signals in timed relation with the received video signal. The vertical oscillator 22 operates at a frequency which is an average of the incoming synchronizing or blanking signals and may be conventional in design typically taking on the form of a monostable multivibrator and differentiator (not shown) combination to provide a pulse train having a series of equally-spaced pulses which have a frequency equal to the average of the incoming vertical synchronizing signals.

The pulsed output of the vertical oscillator 22 is provided to a sawtooth wave signal generator 24 which also may be conventional in design. The sawtooth wave signal generator 24 in a conventional television receiver is typically a capacitor discharge network for generating the required sawtooth current waveform. The positive-going portion of the sawtooth waveform represents the vertical retrace interval, while the negative-going portion thereof corresponds to vertical trace of the CRT's face plate. The waveform typically output by a sawtooth wave signal generator is presented as the solid, uncompensated waveform in FIG. 4A.

Figure 4A:
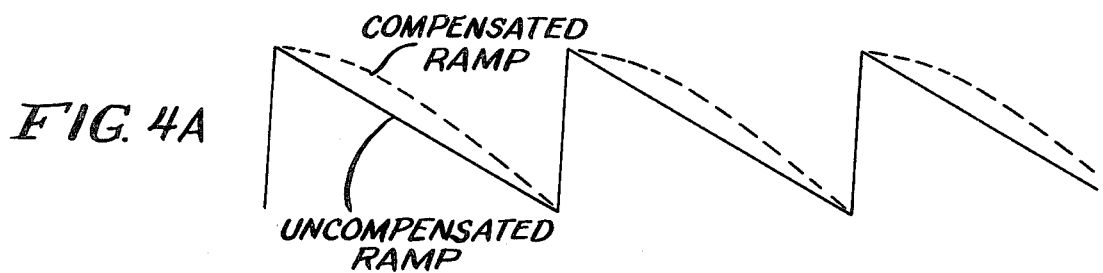
FIGS. 4A, 4B and 4C show the timed relation of signal waveforms at various locations in the vertical image correction system of FIG. 2, with these locations designated by respective letters therein.

By varying the downward slope of the uncompensated ramp signal shown in FIG. 4A, the vertical size of the video image may be selectively controlled. This is accomplished by selectively varying the value of resistance 42 in FIG. 2 and hence the value of the B+ voltage provided to one input of the sawtooth wave signal generator 24. Thus, the pulsed output of the vertical oscillator 22 which represents the vertical retrace interval establishes the timing of the positive-going portion of the ramp signal shown in FIG. 4A, while the slope of the negative-going portion of this ramp signal is established by selectively controlling the B+ input to the sawtooth wave signal generator 24 by means of variable resistance 42. Resistors 38, 40 and 42 function primarily as a vertical size control for selecting a discharge rate for the sawtooth capacitor (not shown) in the sawtooth wave signal generator 24. Resistors 38, 40 and 42 therefore in combination with the synchronizing input signals generated by the vertical oscillator 22 determine the peak-to-peak voltage level of the sawtooth waveform illustrated in FIG. 4A.

Figure 4B:
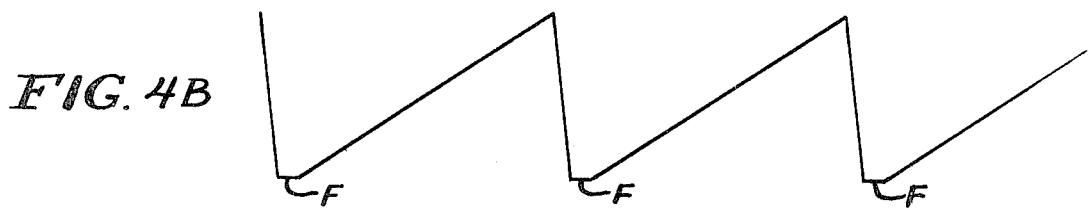
Figure 4C:
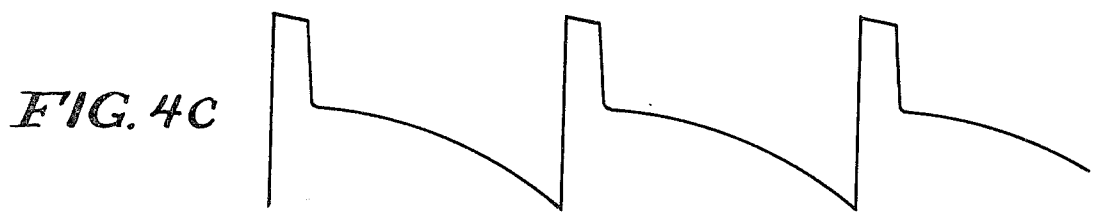

The output of the sawtooth wave signal generator 24 is provided to the noninverting (+) input of a vertical output amplifier 26. The voltage at vertical output amplifier 26 responds to the voltage at the noninverting input thereof. Consequently, a voltage ramp relative to ground is formed at the output terminal of the vertical output amplifier 26. The voltage ramp output of the vertical output amplifier 26, which is shown in FIG. 4C, is applied across the series combination of vertical deflection coil 30, capacitor 32, and a grounded current sensing resistor 44. A ramp of current flows through this series combination in response to the voltage output of the vertical output amplifier 26.

Capacitor 32 coupled in series between vertical deflection coil 30 and current sensing resistor 44 blocks the DC component of the signal representing the current flowing through the vertical deflection coil 30. This DC component of the vertical deflection current is picked off at point "D" and is provided to a feedback circuit 34. Capacitor 32 couples the AC component of the current carried by the vertical deflection coil 30 to current sensing resistor 44. This AC component is picked off at point "E" and is also provided to feedback circuit 34. The two input signals provided to feedback circuit 34 thus represent the DC and AC voltage components of the vertical deflection signal carried by deflecting coil 30. Feedback circuit 34 superimposes the DC component on the aforementioned AC component and provides a composite correction signal to the inverting (−) input of the vertical output amplifier 26. Feedback circuit 34 operates in a conventional manner and may take the form of any number of well-known AC-DC superimposing circuits. The feedback path around vertical output amplifier 26 thus forces the current through the vertical deflection coil 30 to track the ramp voltage at the noninverting input of the vertical output amplifier 26 in a corresponding relationship. Thus, undesirable, inherent operating characteristics of the deflection coil circuit are compensated for in driving the vertical deflection coil 30 in an idealized manner.

Figure 3:
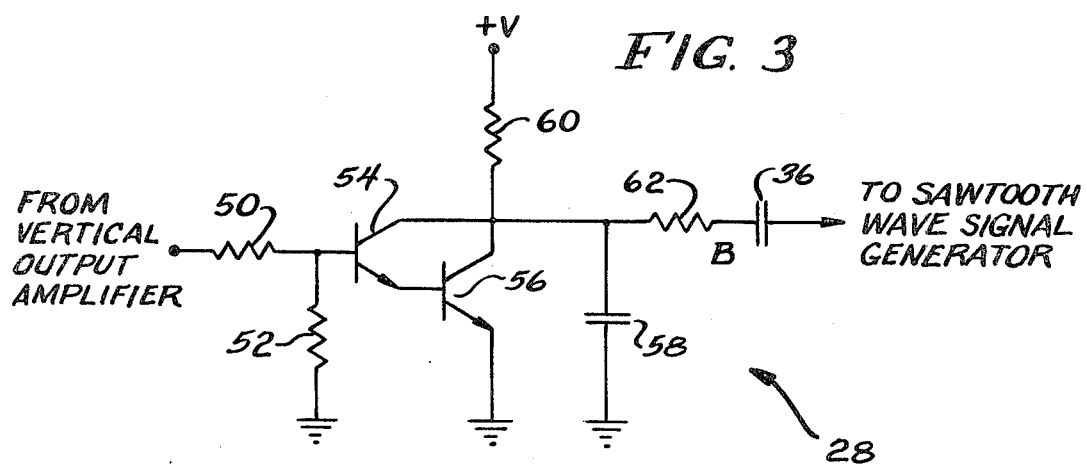
FIG. 3 is a schematic diagram of a vertical rate correction signal generator for use in the vertical image correction system of FIG. 2.

Referring to FIG. 3, there is shown a vertical rate correction signal generator 28 in accordance with a preferred embodiment of the present invention. While the vertical output amplifier 26 provides a sawtooth-shaped current to the vertical deflection coil 30, its pulsed voltage output, shown in FIG. 4C, is provided to a vertical rate correction signal generator 28. The output voltage of the vertical output amplifier 26 is provided via resistors 50, 52 to the base of NPN transistor 54 which in combination with NPN transistor 56 forms a Darlington pair. Resistors 50, 52 establish the threshold level for turn-on of the Darlington pair such that transistors 54, 56 are rendered conductive during the highest, or pulsed, portion of the video output amplifier 26 output signal shown in FIG. 4C. The Darlington pair comprised of transistors 54, 56 is used to provide a large gain for the input signal to the vertical rate correction signal generator 28 since the input signal is divided down by resistors 50, 52. A +V voltage supply is provided across the Darlington pair of transistors 54, 56 which also charges grounded capacitor 58. The pulsed portion of the waveform shown in FIG. 4C provided to the vertical rate correction signal generator 28 results in the turn-on of the Darlington pair of transistors 54, 56. This causes the discharge of grounded capacitor 58 which is represented by the "F" portions of the waveform shown in FIG. 4B. The signal shown in FIG. 4B represents the output of the vertical rate correction signal generator 28, with the flat portion "F" thereof corresponding to the vertical retrace portion of the vertical deflection signal. Following the occurrence of the pulse in the video output amplifier signal provided to the vertical rate correction signal generator 28, the Darlington transistor pair turns off during the relatively flat portion of the aforementioned signal permitting capacitor 58 to be recharged by the +V supply. This corresponds to the positive-going portion of the sawtooth waveform shown in FIG. 4B which represents the vertical rate correction signal provided to the sawtooth wave signal generator 24. Resistor 62 performs a current limiting function while capacitor 36 provides DC blocking and AC coupling for the vertical rate correction signal of FIG. 4B provided back to the sawtooth wave signal generator 24.

The vertical rate correction signal generator output is combined with the vertical size control input derived from the B+ source. This causes the DC size control input provided to the sawtooth wave signal generator 24 to vary with the sawtooth-shaped output of the vertical rate correction signal generator 28 shown in FIG. 4B. Mixing the vertical rate correction signal with the uncompensated ramp signal shown in FIG. 4A in the sawtooth wave signal generator 24 results in the generation of a compensated ramp signal shown in dotted line form in FIG. 4A. The compensated ramp signal is provided by the sawtooth wave signal generator to the noninverting input of the vertical output amplifier 26 as previously described and is used to selectively control the current flowing in the vertical deflection coil 30 so as to decrease the vertical trace rate where the video image appears stretched due to the oblique orientation of the projection screen. Similarly, the compensated ramp signal shown in FIG. 4A provided to the vertical deflection coil 30 correspondingly increases the vertical trace rate over portions of the projection screen where the video image appears compressed due to the aforementioned oblique geometric configuration. The selective variation of the vertical trace rate can be seen in the increasing slope of the compensated ramp signal of FIG. 4A toward the bottom of vertical scan. The present invention will operate equally well when the upper portion of the projection screen is closer to the projector than the lower portion by inversion of the correcting waveform 4B. Thus, by selectively varying the slope of the ramp signal provided to the vertical deflection coil 30, the vertical trace rate is varied to compensate for video image compression and stretching distortion which appears on an obliquely oriented projection television screen.

There has thus been shown a system for correcting for vertical, off-axis optical projection distortions in a projection television system in which the image projection axis is obliquely disposed in the vertical direction relative to the projection screen axis. The vertical trace rate is varied along the vertical dimension of the projection screen such that image stretching is compensated for by decreasing vertical scan rate, while image compression is compensated for by increasing the vertical scan rate.

While particular embodiments of the present invention have been shown and described, it will be apparent to those skilled in the art that changes and modifications may be made therein without departing from the invention and its broader aspects. The aim in the appended claims, therefore, is to cover all such changes and modifications as fall within the true spirit and scope of the invention.

We claim:

1. In a projection television having a projecting screen and at least one cathode ray tube for producing and projecting onto said projecting screen a video image representing a received video signal, wherein said projecting screen is obliquely disposed in the vertical direction relative to the image projection axis of at least said one cathode ray tube, a vertical deflection system for correcting for projected video image vertical distortion comprising:

an oscillator responsive to said received video signal and synchronized therewith for producing a pulsed output signal in timed relation with said received video signal;

circuit means coupled to said oscillator and responsive to said pulsed output signal for generating a substantially linear, sawtooth-shaped output voltage;

a vertical output circuit coupled to said circuit means and responsive to the sawtooth-shaped output voltage therefrom for generating an amplified sawtooth-shaped output current and a pulsed output voltage in timed relation with said received video signal;

a deflection coil coupled to said vertical output circuit and responsive to the output current therefrom for vertically deflecting an electron beam in at least said one cathode ray tube; and vertical rate correction means coupled to said circuit means and said vertical output circuit and responsive to the pulsed output voltage therefrom for decreasing the vertical deflection rate over that portion of said projecting screen where said video image is vertically stretched and increasing the vertical deflection rate over that portion of said projecting screen where said video image is vertically compressed in correcting for the vertical distortion of said video image on said projecting screen.

2. The system of claim 1 wherein said vertical rate correction means includes a DC source coupled to said circuit means for controlling the vertical size of said video image by setting the DC level of said substantially linear, sawtooth-shaped output voltage.

3. The system of claim 1 further including voltage feedback means coupling said deflection coil and vertical output circuit and responsive to the current in said deflection coil for providing a deflection correction signal to said vertical output circuit whereby the current in said deflection coil varies with said substantially linearly, sawtooth-shaped output voltage.

4. The system of claim 3 wherein said vertical output circuit is a differential amplifier.

5. In a projection television having a projecting screen, at least one cathode ray tube having a phosphor screen for producing, by means of an electron beam incident thereupon, and projecting onto said projecting screen a video image representing a received video signal, a sawtooth-shaped voltage signal generator for providing an output in timed relation with said received video signal, a vertical output circuit coupled to said sawtooth-shaped voltage signal generator for providing a sawtooth-shaped output current and a pulsed output voltage in timed relation with said received video signal and a vertical deflection coil coupled to said vertical output circuit and responsive to said sawtooth-shaped output current for deflecting said electron beam across the phosphor screen of said cathode ray tube, wherein said projecting screen is obliquely disposed in the vertical direction relative to the image projection axis of at least said one cathode ray tube, the improvement comprising:

linearly decreasing the vertical deflection rate of said electron beam across that portion of said phosphor faceplate wherein said video image is vertically stretched on said projecting screen and linearly increasing the vertical deflection rate across that portion of said phosphor faceplate wherein said video image is vertically compressed on said projecting screen.

* * * * *